(12) United States Patent
Iihoshi et al.

(10) Patent No.: US 7,753,032 B2
(45) Date of Patent: Jul. 13, 2010

(54) CONTROL APPARATUS FOR CYLINDER INJECTION INTERNAL COMBUSTION ENGINE WITH HIGH-PRESSURE FUEL PUMP

(75) Inventors: Yoichi Iihoshi, Tsuchiura (JP);
Yoshikuni Kurashima, Mito (JP);
Toshio Hori, Hitachinaka (JP); Shin Yamauchi, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/192,557

(22) Filed: Aug. 15, 2008

(65) Prior Publication Data
US 2009/0082939 A1    Mar. 26, 2009

(30) Foreign Application Priority Data
Sep. 20, 2007   (JP) .............................. 2007-243960

(51) Int. Cl.
*F02M 37/06* (2006.01)
*F02M 59/00* (2006.01)

(52) U.S. Cl. .................... 123/508; 123/90.15; 123/457; 123/458

(58) Field of Classification Search ... 123/90.15–90.17, 123/456–458, 508
See application file for complete search history.

(56) References Cited

U.S. PATENT DOCUMENTS

| 4,739,733 | A | * | 4/1988 | Hartmann et al. | ........ | 123/90.17 |
| 5,899,181 | A | * | 5/1999 | Kurata et al. | ............. | 123/90.17 |
| 6,318,343 | B1 | | 11/2001 | Nakagawa et al. | | |
| 6,357,421 | B1 | * | 3/2002 | Pritchard | ..................... | 123/456 |
| 7,073,487 | B1 | | 7/2006 | Oono | | |
| 7,556,023 | B2 | * | 7/2009 | Ilhoshi et al. | ................ | 123/480 |
| 2001/0006061 | A1 | | 7/2001 | Shimada et al. | | |
| 2006/0229794 | A1 | | 10/2006 | Yasui et al. | | |

FOREIGN PATENT DOCUMENTS

| EP | 1 887 206 A1 | 2/2008 |
| JP | 3562351 B2 | 6/2004 |
| JP | 2006-291764 A | 10/2006 |

OTHER PUBLICATIONS

European Search Report dated Feb. 3, 2009 (Three (3) pages).
Japanese Office Action dated Aug. 18, 2009 (Four (4) pages).

* cited by examiner

*Primary Examiner*—Erick Solis
(74) *Attorney, Agent, or Firm*—Crowell & Moring LLP

(57) ABSTRACT

There is provided a control apparatus for a cylinder injection internal combustion engine which suppresses fuel pulsation caused by cam phase deviation and thereby prevents internal combustion engine exhaust deterioration, so that the reliability of a high-pressure fuel system using a high-pressure fuel pump is improved. The control apparatus for a cylinder injection internal combustion engine includes a high-pressure fuel pump that raises the pressure of fuel and discharges the fuel to a fuel rail, and a fuel pressure sensor that detects a pressure of fuel stored in the fuel rail. The control apparatus controls the high-pressure fuel pump based on the fuel pressure detected by the fuel pressure sensor. The control apparatus further includes a cam phase estimation means for estimating a phase of a cam shaft of the internal combustion engine which drives the high-pressure fuel pump, and based on the phase estimation value calculated by the cam phase estimation means, corrects the amount of controlling the high-pressure fuel pump.

8 Claims, 16 Drawing Sheets

(Prior Art)

(Prior Art)

(Prior Art)

CONTROL APPARATUS FOR CYLINDER INJECTION INTERNAL COMBUSTION ENGINE WITH HIGH-PRESSURE FUEL PUMP

BACKGROUND OF THE INVENTION

1. Field of the Invention

The present invention relates to a control apparatus for a cylinder injection internal combustion engine with high-pressure fuel pump, and more particularly to a control apparatus for a high-pressure fuel system of a cylinder injection internal combustion engine including a variable valve mechanism in a cam shaft which drives a high-pressure fuel pump.

2. Background Art

In cylinder injection internal combustion engines, after the fuel pressure has been raised to a target value, the cylinder injection is performed. In this case, the control apparatus for the cylinder injection internal combustion engine with high-pressure fuel pump regulates the discharge amount of the high-pressure fuel pump of the high-pressure fuel system according to fuel injection amount and fuel pressure. Also, the injector control apparatus of the control apparatus for a cylinder injection internal combustion engine corrects the valve opening time of the injector according to fuel pressure to regulate the injection amount.

In this high-pressure fuel system, when the fuel pressure pulsation in the fuel rail increases, there occurs a difference between the detection value from a fuel pressure sensor and the fuel pressure during injection. As a result, the injector fuel pressure correction does not work properly, so the injection amount may deviate from stoichiometry, causing exhaust deterioration. Further, due to the deviation of injection, a large pulsation may occur; this is a factor in reduced reliability of the high-pressure fuel system.

As a related art technique of preventing occurrence of such pulsation to regulate the fuel pressure to a target value, there has been disclosed a technique (for example, JP Patent No. 3562351 mentioned below) of feeding back a detected fuel pressure value to the pump discharge amount. Further, JP Patent No. 3562351 deals with variable valve mechanism; a cam angle sensor detects a cam phase, and the detected value is used as a control element for pump control, thereby preventing occurrence of discharge amount variation based on cam phase variation.

SUMMARY OF THE INVENTION

However, the above described relate art does not give due consideration to phase deviation (cam phase deviation) of the cam shaft which drives the high-pressure fuel pump. The term "cam phase deviation" means phase difference between crank angle and cam angle. Cam phase deviation is caused by lift resistance produced in lifting an inlet valve working as rotation load of the cam shaft, pump lift resistance for driving the plunger of high-pressure fuel pump, or a cam phase mechanism which varies the cam phase.

Accordingly, in the cam phase detected by the cam angle sensor, a detection error occurs; thus when the detected cam phase is used as it is, a variation in pump discharge amount may occur. Further, in the fuel pressure feedback control, the cam phase deviation acts as disturbance; when this cam phase deviation occurs on the order of several Hz, when simple feedback control such as PI control is applied, the pulsation cannot be suppressed.

FIG. 14 illustrates an example of the related art high-pressure fuel pump control. In this control, an FF control means 501 calculates, based on the injection amount, OFF angle of a high-pressure fuel pump 503 to thereby maintain at a given value, the fuel balance in the fuel rail of a fuel system plant 504. An FB control means 502 calculates a difference between fuel pressure in the fuel rail and target fuel pressure to correct OFF angle by discharge amount (injection) error. Further, for cam phase correction, a cam angle sensor to be described later detects a cam phase, and OFF angle is corrected according to the detected cam phase variation.

In the above described high-pressure fuel pump control, when the discharge amount of high-pressure fuel pump is regulated to maintain the fuel pressure at a given value, the aforementioned fuel pressure pulsation acts as control noise. According to the related art, averaging or the like is performed to eliminate this noise; it is thus difficult to suppress pulsation with respect to phase deviation of several Hz.

The timings of these electromagnetic valve signal and injection pulse signal are typically set with reference to crank angle. Accordingly, when the phase of cam shaft varies, correction is made according to cam phase by use of the variable valve mechanism; but since the cam angle sensor detects only an instantaneous cam phase deviation, this is a factor in occurrence of pulsation.

The above problems of the related art will be described in greater detail with reference to FIGS. 15 to 20.

FIG. 15 illustrates an exemplary variable valve control apparatus which makes variable the phase of a cam attached to a cam shaft. A variable valve control apparatus 602 mounted in a control unit 601 detects a cam phase from a cam plate 609 installed in a cam shaft 610, using a cam angle sensor 611. The variable valve control apparatus 602 regulates a command value (DUTY) to an oil control valve 603 so that the detected cam phase changes to a target cam phase.

The oil control valve 603 regulates according to DUTY, the amount of oil flowing into a variable valve mechanism 604 and thereby varies the cam phase. In this case, the phase of a cam lift 605 in a high-pressure fuel pump 503 varies simultaneously with the phases of valve lifts 606, 607 and 608. Accordingly, when OFF angle correction is not made according to cam phase variation, the discharge amount is deviated, thus causing fuel pressure pulsation.

There will be described below the reason why, with only the cam phase detection by the cam angle sensor 611 and the use of the detected value, no proper discharge amount control of the high-pressure fuel pump 111 can be implemented.

FIG. 16 illustrates an exemplary relationship between cam and crank angle. Referring to FIG. 16, the valve is lifted three times in the crank angle of 720 deg (corresponding to one bank of V6 engine). In order to detect the phase of the cam shaft, the cam plate 609 is installed in the cam shaft 610, and a phase of the inlet cam is detected from a notch of the plate 609. This notch is used as cam reference (CAMREF); a cam phase is calculated from a time delay (T1 or T2) occurring from crank angle reference (CRANKREF) to when CAMREF is detected.

Here, due to lift resistance of the inlet valve, the rotation speed (CAM speed) of the cam shaft 610 varies around half the crank rotation speed (a state in which the cam rotates at half the speed of the crank). Accordingly, when the phase is calculated from T1, the operation is in the middle of descending CAM lift 2, so the cam rotation speed increases and thus the cam phase is calculated delayed relative to the true value. On the contrary, when the phase is calculated from T2, the operation is in the middle of ascending CAM lift 1, so the cam rotation speed decreases and thus the cam phase is calculated advanced relative to the true value. In this way, in the cam phase detected by the cam angle sensor 611, due to cam angular speed variation, there occurs a detection error dependent on the magnitude of cam phase deviation. Thus, when the cam phase detection value is used as it is, pulsation dependent on detection error occurs.

FIG. 17 illustrates a relationship between the difference of angular speed between cam and crank and the detection error. As illustrated in FIG. 17, the detection error increases with the increase of the difference of angular speed. The difference of angular speed is mainly caused by lift resistance in cam rotation, but also caused by the resonance of a chain which drives the cam, or by the rotation variation of another cam shaft driven by the same chain.

FIG. 18 illustrates a relationship between angular speed and phase deviation. Obtained by integrating crank angular speed/2 and the difference of angular speed ($\Delta$) is cam phase variation (phase deviation) as seen from the crank. Accordingly, phase deviation increases with the increase of the difference of angular speed.

Both the above-described detection error and phase deviation are caused by the angular speed variation of the cam shaft; and the detection error and phase deviation vary according to the operating state (the number of rotations of engine), and the magnitude is approximately 1 to 4 deg in crank angle. The detection error and phase deviation pose no problems in the air intake control by the variable valve and thus have been overlooked. In high-pressure fuel pump control, however, a phase deviation of 1 deg may cause pressure variation of about 0.5 MPa, thus posing a considerable problem.

A phase deviation factor other than the inlet valve lift will be described.

FIG. 19 illustrates another example of relationship between the cam and crank angle. In addition to FIG. 16, the plunger lift of high-pressure fuel pump is illustrated in FIG. 19. The lift resistance of pump cam is different from that of the inlet cam described above; the lift resistance of pump cam varies significantly according to the discharge amount of high-pressure fuel pump and the fuel pressure of fuel rail. More specifically, the resistance which presses the plunger of high-pressure fuel pump increases with the increase of fuel pressure and discharge amount. Here, a setting is made so that the pump lift resistance cancels cam angular speed variation caused by inlet valve lift resistance; as illustrated in FIG. 19, phase deviation decreases with the increase of discharge amount.

FIG. 20 illustrates an example of time chart at the time of cam phase control. Here, there is illustrated a case where pump OFF angle is regulated based on the cam phase calculated delayed based on T2 (illustrated in FIG. 16). The typical variable phase mechanism is designed so that the default position (typically, most delayed angle) is recovered when no control is performed; further, due to the above described lift resistance, a small delay occurs relative to crank speed/2. Further, when the variable mechanism is driven by oil pressure, there also occurs oil leakage. These factors cause the cam phase to be delayed gradually relative to a target value, and there is repeated an operation of advancing the cam angle each time that delayed angle is detected; when this period reaches several Hz, this causes fuel pressure pulsation.

To address these problems, the present invention has been devised, and its object is to provide a control apparatus for a cylinder injection internal combustion engine which suppresses fuel pulsation caused by cam phase deviation and thereby prevents internal combustion engine exhaust deterioration, so that the reliability of a high-pressure fuel system using a high-pressure fuel pump is improved. More specifically, the object is to provide a control apparatus for a cylinder injection internal combustion engine with high-pressure fuel system which estimates cam phase deviation and using the estimated cam phase deviation, corrects the pump control angle of the high-pressure fuel pump.

To achieve the above object, the inventive control apparatus for a cylinder injection internal combustion engine includes: a high-pressure fuel pump that raises the pressure of fuel and discharges the fuel to a fuel rail; and a fuel pressure sensor that detects a pressure of fuel stored in the fuel rail. The control apparatus for a cylinder injection internal combustion engine controls the high-pressure fuel pump based on the fuel pressure detected by the fuel pressure sensor. The control apparatus further includes a cam phase estimation means for estimating a phase of a cam shaft of the internal combustion engine which drives the high-pressure fuel pump, and the control apparatus corrects, based on the phase estimation value calculated by the cam phase estimation means, the amount of controlling the high-pressure fuel pump. According to the present invention, discharge error caused by cam shaft phase deviation can be reduced, thus reducing fuel pressure pulsation.

According to a specific aspect of the inventive control apparatus for a cylinder injection internal combustion engine, the cam phase estimation means estimates a cam phase based on at least one of a fuel discharge amount from the high-pressure fuel pump and the state of an inlet or outlet variable valve of the internal combustion engine. According to the present invention, phase deviation can be estimated properly, allowing further reduction in fuel pressure pulsation.

According to another specific aspect of the inventive control apparatus for a cylinder injection internal combustion engine, the state of the variable valve corresponds to one of lift rate and cam phase advanced angle quantity.

Further, according to another specific aspect of the inventive control apparatus for a cylinder injection internal combustion engine, the difference between the phase estimation value estimated based on the discharge amount of the high-pressure fuel pump and a detection value of a cam phase sensor of the cam shaft is made small as the fuel discharge amount of the high-pressure fuel pump increases; and the phase is estimated based on the lift amount of the variable valve, and the difference between the phase estimation value and the detection value of the cam phase sensor are made large as the lift amount increases; further, the phase is estimated based on the phase advanced angle quantity of the variable valve, and the difference between the phase estimation value and the detection value of the cam phase sensor is minimized when the phase advanced angle quantity is a most delayed angle. According to the present invention, with the above configuration, fuel pressure pulsation can be reduced by a simple method.

Further, according to another specific aspect of the inventive control apparatus for a cylinder injection internal combustion engine, the control apparatus further includes a phase disturbance correction means, and the phase disturbance correction means calculates phase disturbance based on a control command value to the high-pressure fuel pump and a detection value of the fuel pressure sensor and thereby corrects the amount of controlling the high-pressure fuel pump. According to the present invention, with the above configuration, even when phase estimation is deviated in some degree, this is detected as phase disturbance and corrected, so the increase in fuel pressure pulsation can be prevented.

Further, according to another specific aspect of the inventive control apparatus for a cylinder injection internal combustion engine, there is provided a control apparatus that includes a high-pressure fuel pump that raises the pressure of fuel and discharges the fuel to a fuel rail and a fuel pressure sensor that detects a pressure of fuel stored in the fuel rail, and controls the high-pressure fuel pump based on the fuel pressure detected by the fuel pressure sensor; and the internal combustion engine includes a variable lift mechanism that makes variable the cam lift amount of an inlet or outlet valve installed in the cam shaft, and a lift sensor that detects the cam lift amount; and the control apparatus corrects, based on the cam lift amount, the amount of controlling the high-pressure fuel pump. According to the present invention, with the above configuration, phase deviation can be estimated easily using a value from the lift sensor.

According to the present invention, robust discharge amount control of a high-pressure fuel pump can be implemented with respect to angular speed variation (cam phase deviation) of the cam shaft which drives the high-pressure fuel pump; thus fuel pressure pulsation of the fuel rail and the like is reduced. Since the pulsation is reduced, the reliability of high-pressure system components such as fuel rail is improved. Accordingly, the target fuel pressure of the fuel rail and the like can be set higher and at the same time, it is possible to reduce exhaust deterioration of the internal combustion engine and also to improve combustion efficiency.

The present specification encompasses the content of the specification of Japanese Patent Application No. 2007-243960 on which the priority of the present application is based.

BRIEF DESCRIPTION OF THE DRAWINGS

FIG. 6A is a view illustrating a relationship between phase deviation and pump discharge amount×fuel pressure; FIG. 6B a view illustrating a relationship between phase deviation and cam phase; and FIG. 6C is a view illustrating a relationship between phase deviation and cam lift amount.

DETAILED DESCRIPTION OF THE PREFERRED EMBODIMENTS

Embodiments of a control apparatus for a cylinder injection internal combustion engine with high-pressure fuel pump according to the present invention will be described with reference to the accompanying drawings.

Figure 1:
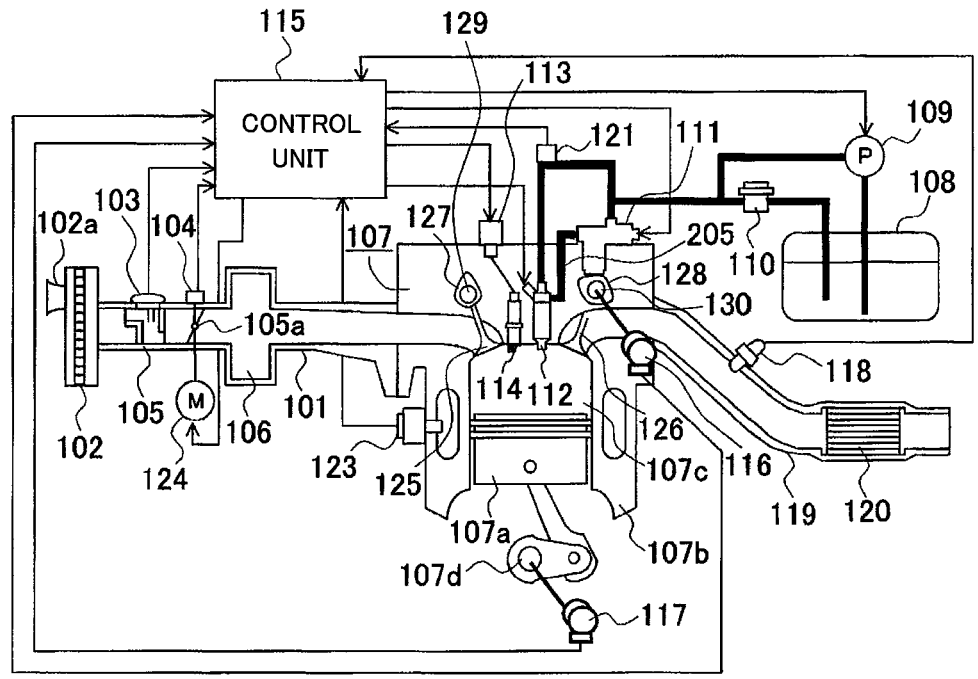
FIG. 1 is a view illustrating an overall configuration of a cylinder injection internal combustion engine with high-pressure fuel pump to which embodiments of the present invention are to be applied.

FIG. 1 is a view illustrating an overall configuration of a cylinder injection internal combustion engine with high-pressure fuel pump to which embodiments of the present invention are to be applied.

Referring to FIG. 1, air taken from an inlet 102a of an air cleaner 102 of an internal combustion engine 107 passes through an airflow sensor 103 being one of the operating state measurement means of the internal combustion engine 107, and further through a throttle body 105 containing an electrically controlled throttle valve 105a which regulates the intake air flow, and then enters a collector 106; and the air taken into the collector 106 is distributed to each inlet pipe 101 connected to respective cylinders 107b of the internal combustion engine 107, and thereafter guided to a combustion chamber 107c in the cylinder 107b.

Fuel such as gasoline is taken from a fuel tank 108 and first-pressurized by a fuel pump 109, and the fuel pressure is regulated by a fuel pressure regulator 110 to a given value and at the same time, the fuel is second-pressurized by a high-pressure fuel pump 111 to a higher value, and sent under pressure to a fuel rail 205. The high-pressure fuel is injected from an injector 112 installed in the cylinder 107b to the combustion chamber 107c. The fuel injected to the combustion chamber 107c is ignited at an ignition plug 114 by an ignition signal of a high voltage from an ignition coil 113 and burnt.

The exhaust gas of fuel burnt in the combustion chamber 107c is guided to an exhaust pipe 119 and discharged via a catalyzer 120 to the outside.

Each cylinder 107b of the internal combustion engine 107 has an inlet valve 125 in the air inlet side and an exhaust valve 126 in the air exhaust side; and the inlet valve 125 and exhaust valve 126, driven by cams 127 and 128 of cam shafts 129 and 130, respectively, are opened or closed.

A control unit 115 being a control apparatus is installed in the internal combustion engine 107; and a signal indicating intake air flow from the airflow sensor 103 is outputted to the control unit 115. A throttle sensor 104 being one of the operating state measurement means of the internal combustion engine 107 which detects opening of the electrically controlled throttle valve 105a is installed in the throttle body 105; and its signal is also outputted to the control unit 115.

A cam angle sensor 116 installed in the cam shaft 130 of the exhaust valve 126 detects a phase of the cam shaft and outputs its detection signal to the control unit 115. Here, the cam angle sensor 116 may be installed in the cam shaft in the inlet valve 125 side. Further, a crank angle sensor 117 used to detect a rotation and phase of a crankshaft 107d of the internal combustion engine 107 is installed on the crankshaft 107d, and its output is received by the control unit 115.

Further, a fuel pressure sensor 121 installed in the fuel rail 205 detects a fuel pressure and outputs its detection signal to the control unit 115; and an air-fuel ratio sensor 118 installed in the upstream of the exhaust pipe 119 relative to the catalyzer 120 detects oxygen in the exhaust gas and outputs its detection signal to the control unit 115.

Figure 2:
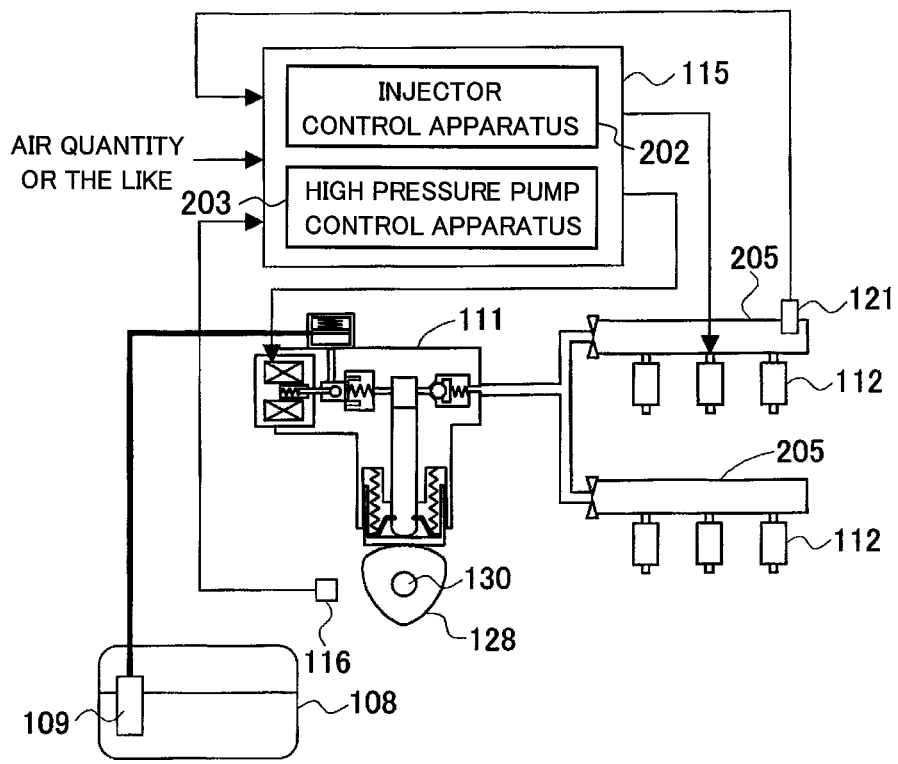
FIG. 2 is a configuration diagram of a fuel control system of FIG. 1.

FIG. 2 is a configuration diagram illustrating the outline of a fuel control system of the internal combustion engine 107. The control unit 115 includes an injector control apparatus 202 and a high-pressure fuel pump control apparatus 203. The injector control apparatus 202 controls fuel injection amount of each injector 112 based on air quantity, air-fuel ratio, engine rotation number and the like, so that a target amount of fuel is injected to the combustion chamber 107c in the cylinder 107b of the internal combustion engine 107. With the fuel sucked from the fuel tank 108 by the fuel pump 109, the high-pressure fuel pump control apparatus 203 controls the high-pressure fuel pump 111 based on outputs from the fuel sensor 121 installed in the fuel rail 205 and the cam angle sensor 116 of the cam 128 which drives the high-pressure fuel pump 111.

Figure 3:
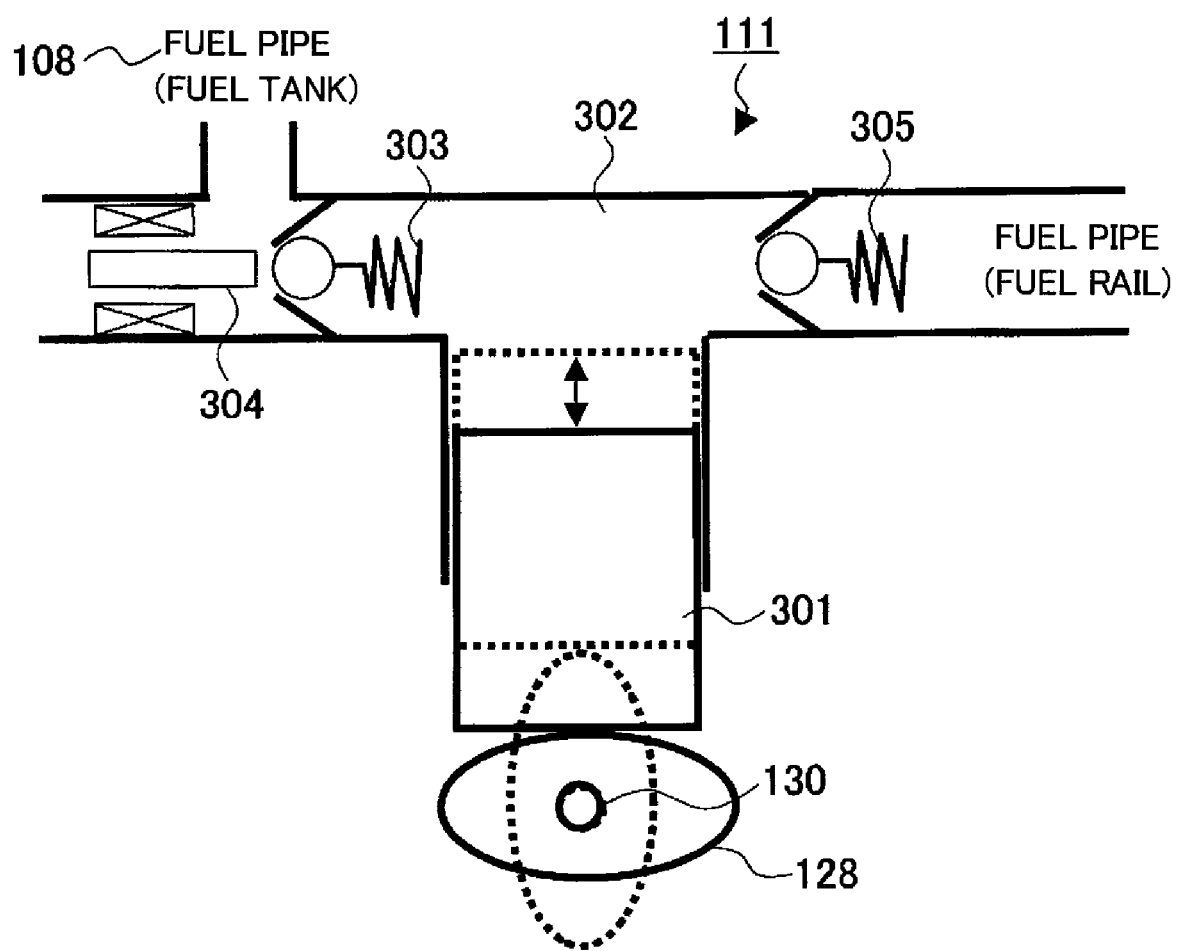
FIG. 3 is a view illustrating a specific example of the high-pressure fuel pump of FIG. 1.

FIG. 3 illustrates an example of the high-pressure fuel pump 111. In the example, when a plunger 301 moves in an upward/downward direction, fuel is supplied from a fuel pipe in the tank 108 side, and sucked via a suck check valve 303 into a pump chamber 302 and discharged via an exhaust check valve 305 to a fuel pipe in the fuel rail 205 side. The discharge regulation of the high-pressure fuel pump 111 is performed by opening the suck check valve 303 by use of an electromagnetic valve 304 during ascent of the plunger 301 and thereby causing fuel to flow back to the fuel tank 108 side. Thus, in order to properly regulate the discharge of the high-pressure fuel pump 111, the phase of the cam shaft 130 must be accurately perceived so that power is supplied to the electromagnetic valve 304 at a proper timing. It is noted that the present invention can be applied not only to the single-cylinder pump 111 as illustrated in the drawings but also to a configuration of multi-cylinder pump.

Figure 4:
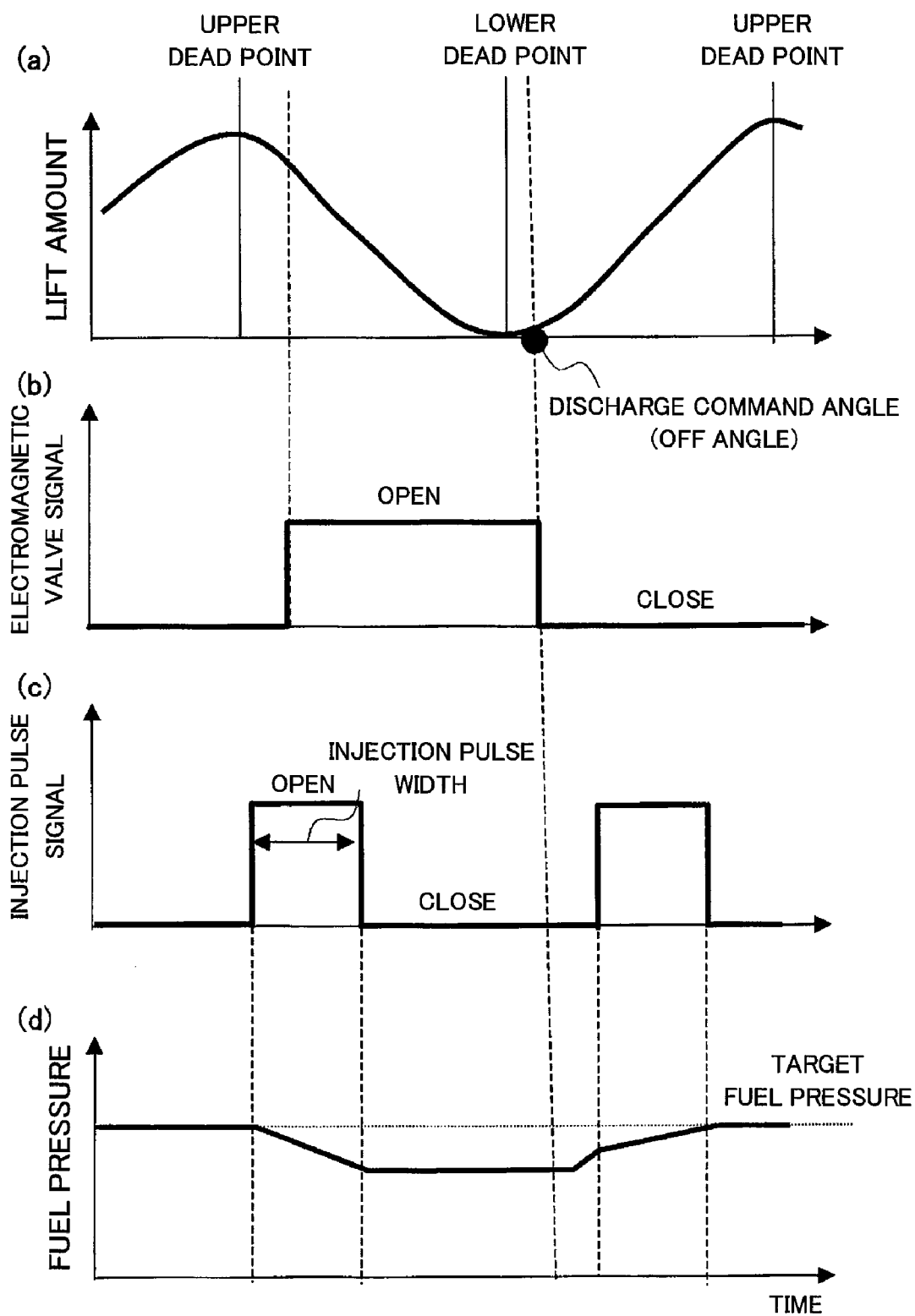
FIG. 4 is a time chart illustrating an example of operation of the fuel control system of the control apparatus of the cylinder injection internal combustion engine with high-pressure fuel pump illustrated in FIG. 1 according to an embodiment of the present invention.

FIG. 4 is a time chart schematically illustrating relationships between (a) the lift amount of the plunger 301 and (b) a drive signal (electromagnetic valve signal) of the high-pressure fuel pump 111, between (a) the lift amount of the plunger 301 and (c) a drive signal (injection pulse signal) of the injector, and between (a) the lift amount of the plunger 301 and (d) fuel pressure measured in the fuel rail. The high-pressure fuel pump 111 sucks fuel while the plunger 301 moves from an upper dead point to a lower dead point, and discharges fuel while the plunger 301 moves from a lower dead point to an upper dead point.

The fuel discharge amount is determined chiefly by the timing (OFF angle) of closing of the electromagnetic valve 304; the discharge amount decreases as the delay of OFF angle of the electromagnetic valve 304 relative to the upper dead point increases. Meanwhile, in the injector 112, its injection valve is opened according to an injection pulse signal; with the same fuel pressure, the injection amount increases as the opening time of injection pulse signal is set longer. In this case, the fuel pressure measured in the fuel rail 205 rises when the high-pressure fuel pump 111 discharges, and falls when the injector 112 injects fuel; this phenomenon causes fuel pressure pulsation.

First Embodiment

Figure 5:
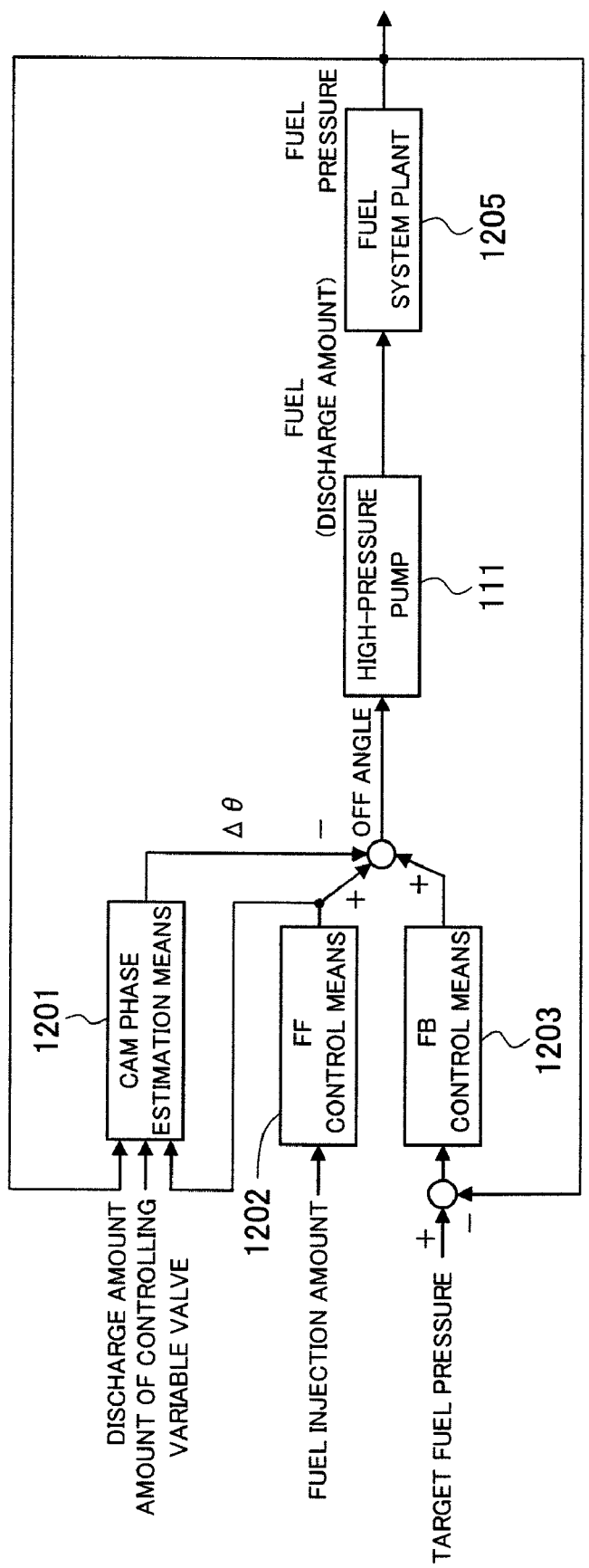
FIG. 5 is a block diagram illustrating the outline of pump control by the control apparatus for the cylinder injection internal combustion engine with high-pressure fuel pump illustrated in FIG. 1 according to a first embodiment of the present invention.

FIG. 5 is a block diagram illustrating the outline of a first embodiment of a control apparatus for a cylinder injection internal combustion engine with high-pressure fuel pump according to the present invention.

Figure 14:
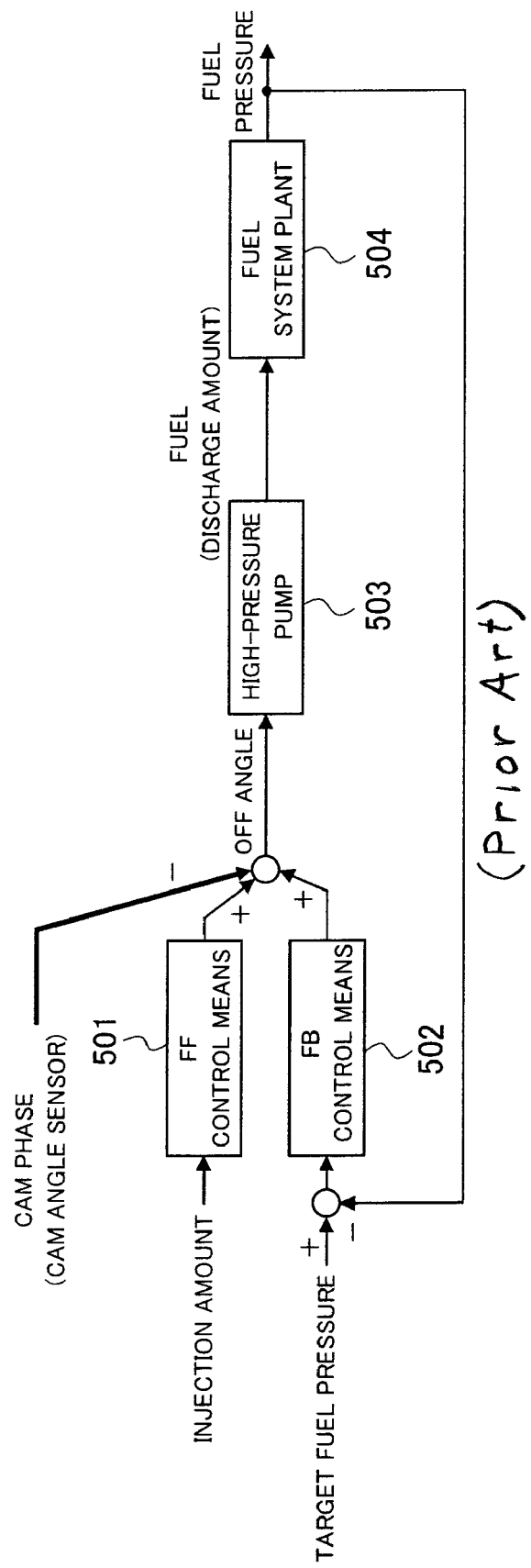
FIG. 14 is a block diagram illustrating the outline of pump control by a related art control apparatus for a cylinder injection internal combustion engine with high-pressure fuel pump.

A control apparatus of the first embodiment of the present invention includes a cam phase estimation means 1201 which, without using a cam phase detection value as it is as with the related art illustrated in FIG. 14, estimates phase deviation by use of one of discharge amount, the amount of variable valve control, fuel pressure, and OFF angle calculated by an FF control means 1202, so that phase deviation is corrected. With this configuration, phase deviation which cannot be detected by the cam angle sensor 116 can be corrected, thus allowing implementation of higher-precision discharge control. Here, the FF control means 1202, FB control means 1203, high-pressure fuel pump 111 and fuel plant 1205 are identical to those of the related art of FIG. 14, and hence an explanation thereof is omitted.

Figure 6:
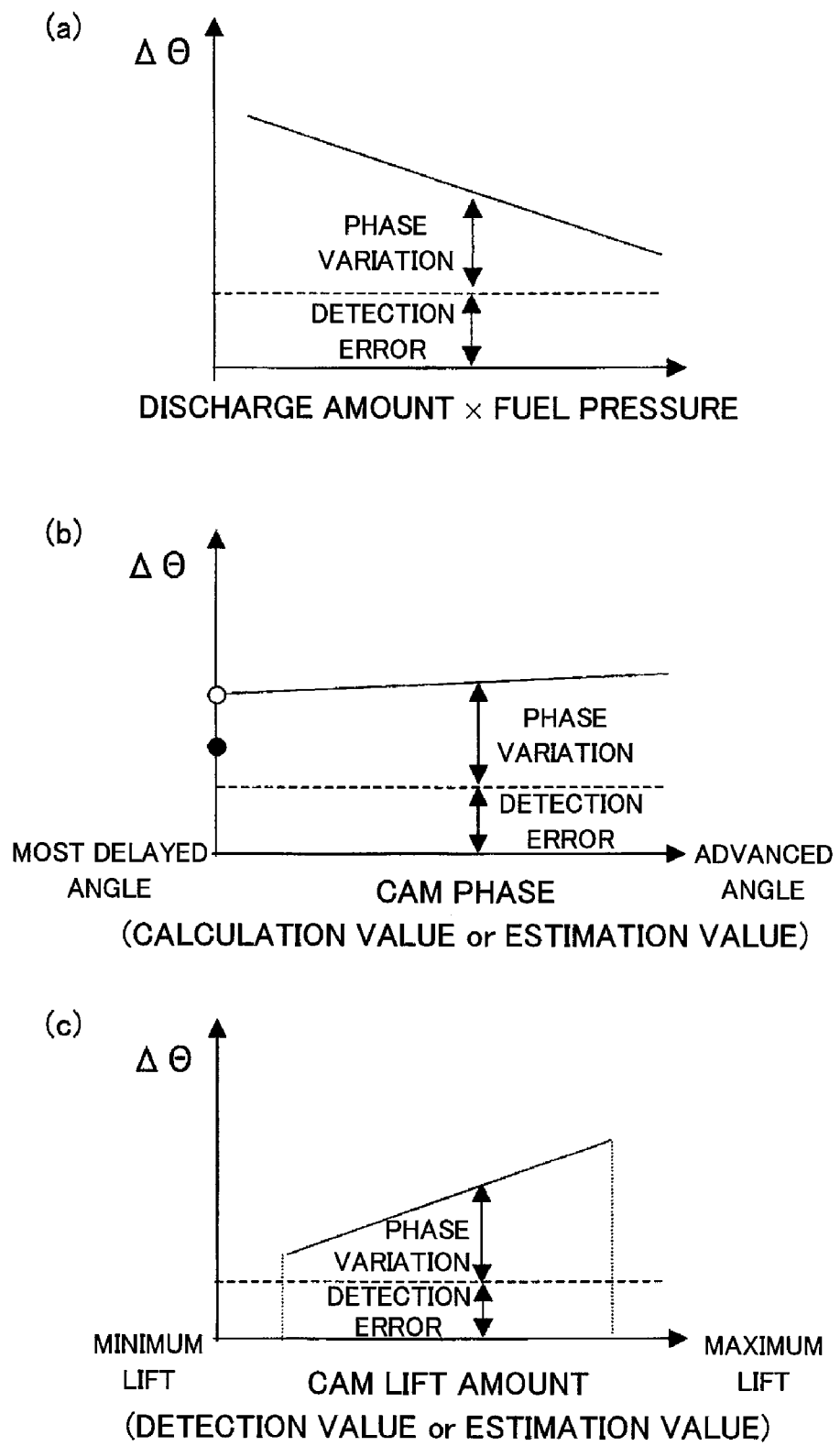
FIG. 6 is a view illustrating a specific example of phase deviation correction by the control apparatus of FIG. 5.

FIG. 6 illustrates a specific example of phase deviation correction. Referring to FIG. 6(a), phase deviation (ΔΘ) is reduced with the increase of discharge amount×fuel pressure. This is because the rotation resistance of pump cam lift increases with the increase of discharge amount and fuel pressure; thus phase deviation caused by cam lift rotation resistance can be corrected, so that pulsation is reduced by proper fuel discharge.

Referring to FIG. 6(b), ΔΘ is increased as the phase advances from the most delayed angle. This is because the cam phase is locked at the most delayed angle and thus the phase deviation at the most delayed angle is smaller than when the cam phase is not locked, so that phase deviation difference dependent on cam phase position can be corrected, thus allowing proper fuel discharge to reduce pulsation. In this case, as the cam phase, there may be used one calculated from the cam angle sensor, or a value estimated from the amount of cam control to be described later.

Referring to FIG. 6(c), ΔΘ is increased with the increase of the lift amount of inlet valve cam. When the cam lift amount increases, the rotation resistance increases, increasing the phase deviation. Thus, cam lift amount is estimated from a cam lift control signal so that, even when the cam lift amount varies, the phase deviation caused by the inlet (or exhaust) valve lift resistance is corrected, whereby proper fuel discharge can be achieved to reduce pulsation.

Here, there has been described the case where the lift amount varies continuously; but the present invention is not limited thereto and can be applied to a case where the lift amount varies in two steps.

Figure 7:
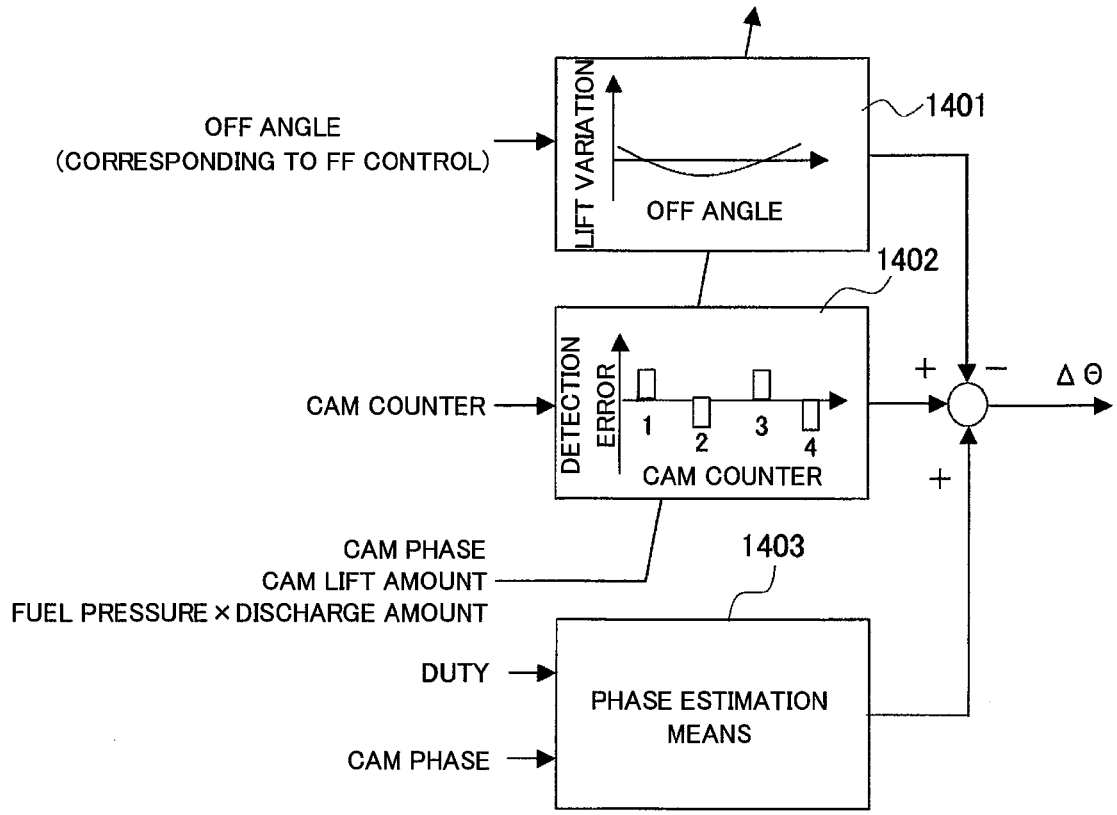
FIG. 7 is a block diagram illustrating details of pump control by the control apparatus according to the first embodiment of the present invention.

FIG. 7 illustrates an exemplary detailed configuration when a control apparatus according to the present embodiment is mounted. The control apparatus according to the present embodiment, including a lift variation calculation means 1401 for calculating phase deviation caused by inlet valve lift and the plunger lift of high-pressure fuel pump, a detection error calculation means 1402 for calculating a detection error caused by lift variation, and a VVT phase estimation means 1403 for estimating a phase during VVT operation, estimates a cam phase while considering phase deviation.

The lift variation calculation means 1401 calculates phase deviation at OFF angle at which the inlet valve of high-pressure fuel pump closes, based on MAP preliminarily calculated from angular speed difference. The detection error calculation means 1402 calculates a detection error according to CAM counter which varies each time each CAMREF is passed, based on a value preliminarily calculated from angular speed difference at the time of passing CAMREF. The VVT phase estimation means 1403 estimates a cam phase using an after-mentioned method. Since the angular speed difference varies, as described with reference to FIG. 13, according to cam phase, cam lift amount and discharge amount ×fuel pressure, MAP may be prepared according to these, so that MAP is changed at the right time.

Figure 8:
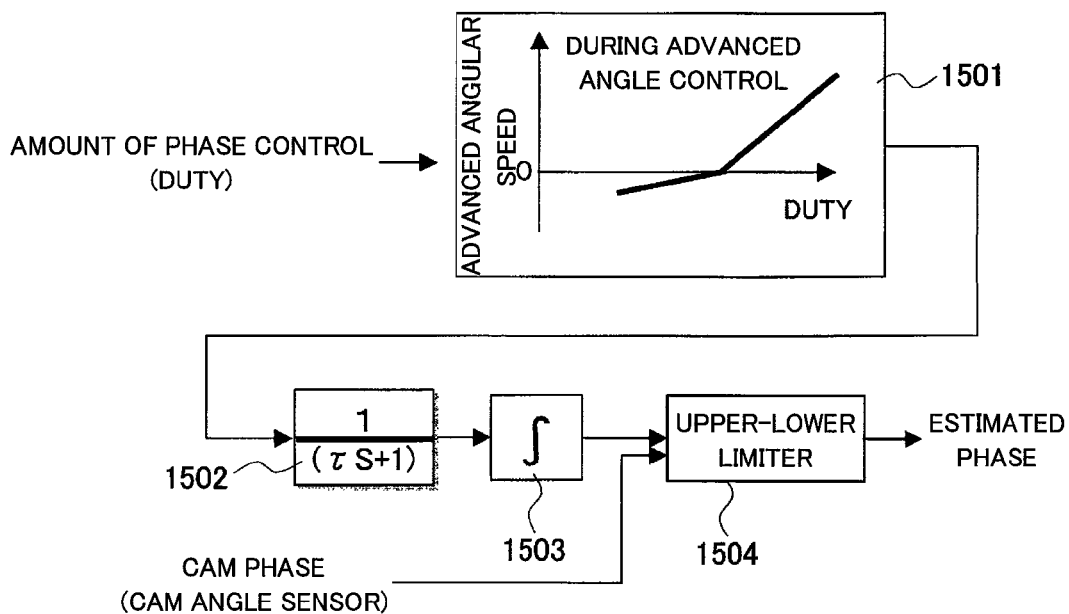
FIG. 8 is a block diagram illustrating details of a phase estimation means of the control apparatus of FIG. 5 according to the first embodiment of the present invention.

FIG. 8 is a block diagram illustrating the outline of the VVT phase estimation means. A cam advanced-angular speed calculation means 1501 calculates an advanced-angular speed from the amount of phase control (DUTY). Here, based on advanced-angular speed MAP dependent on DUTY, the advanced-angular speed is calculated. More preferably, the advanced-angular speed may be corrected according to the lift resistance of inlet valve and the lift resistance of pump plunger which cause the phase deviation. In this case, correction is made so that the advanced-angular speed is reduced with the increase of the lift resistance.

A dynamics estimation means 1502 estimates a variable phase mechanism dynamic delay. Here, the variable-valve dynamics is represented by simple first-order delay, and time constant τ (approximately 100 ms) is set according to cam operation response.

A phase calculation means 1503 integrates cam speed to calculate a cam phase; and an upper-lower limiter 1504 applies limitation so that the phase estimation value falls within a prescribed range relative to the cam phase detected by the cam angle sensor, whereby the variance of phase estimation value is prevented.

Figure 9:
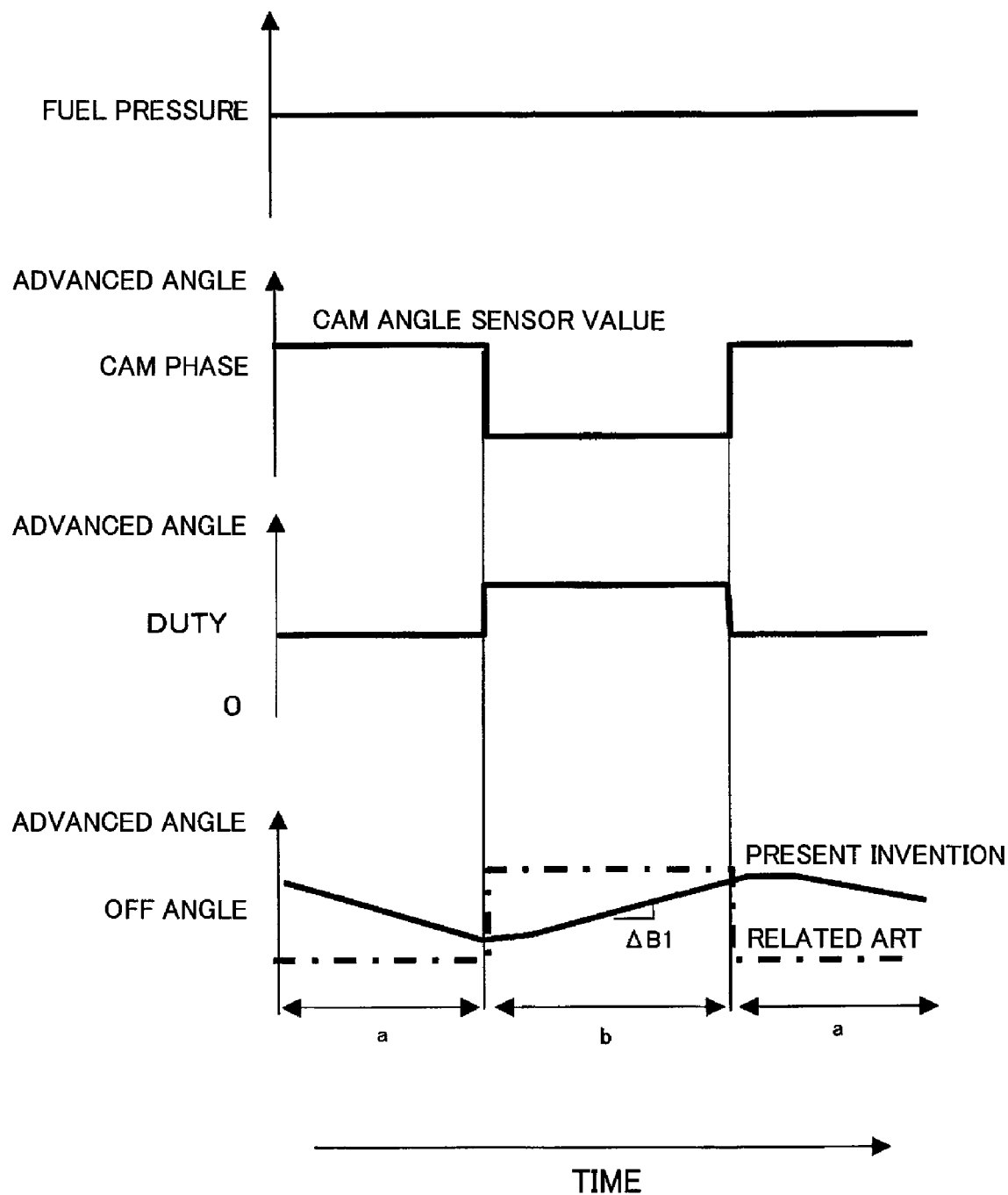
FIG. 9 is a time chart of control by the control apparatus of FIG. 5 according to the first embodiment of the present invention.
Figure 15:
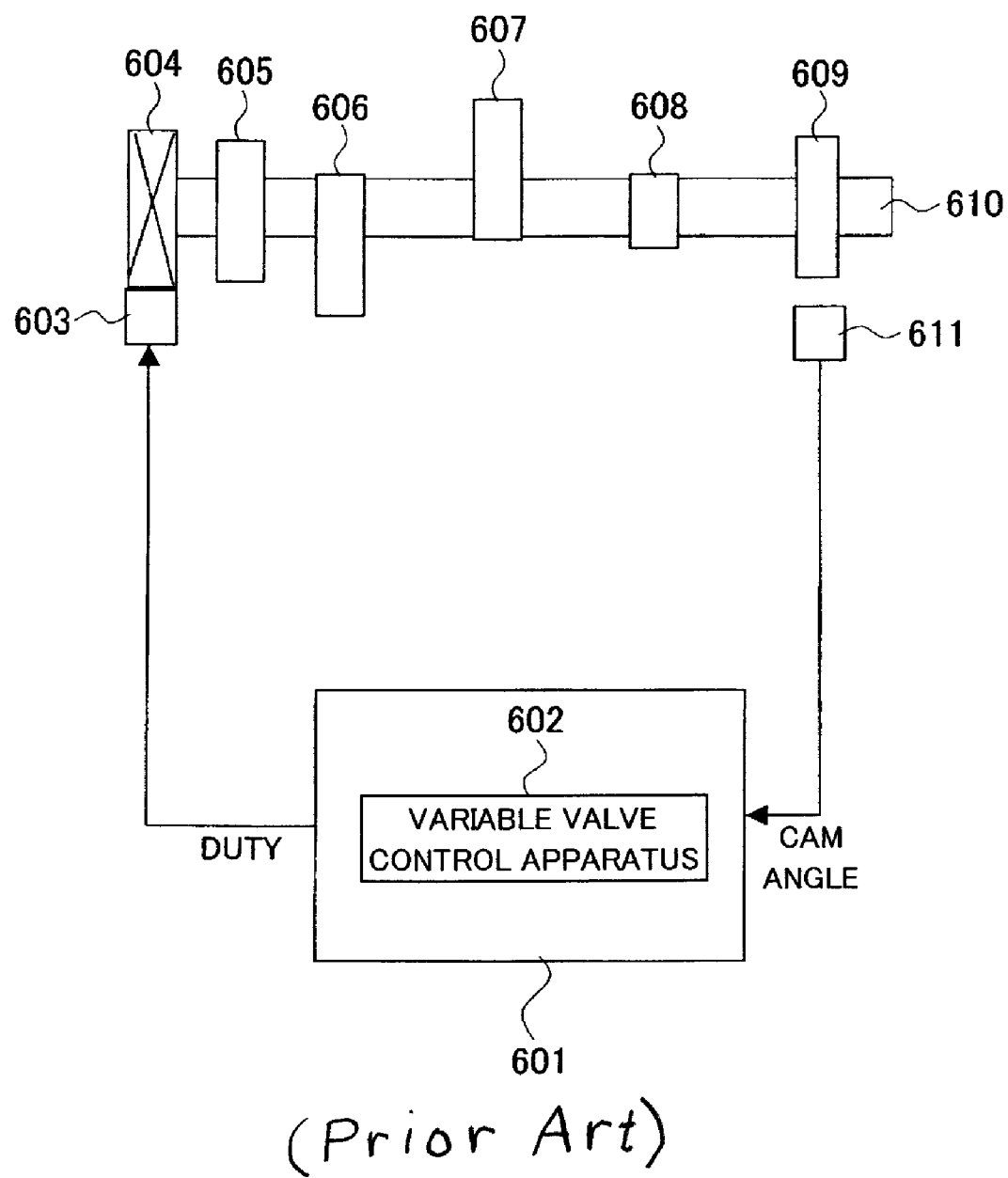
FIG. 15 is a view illustrating the outline of variable valve mechanism by the control apparatus of FIG. 14 for a cylinder injection internal combustion engine with high-pressure fuel pump.
Figure 16:
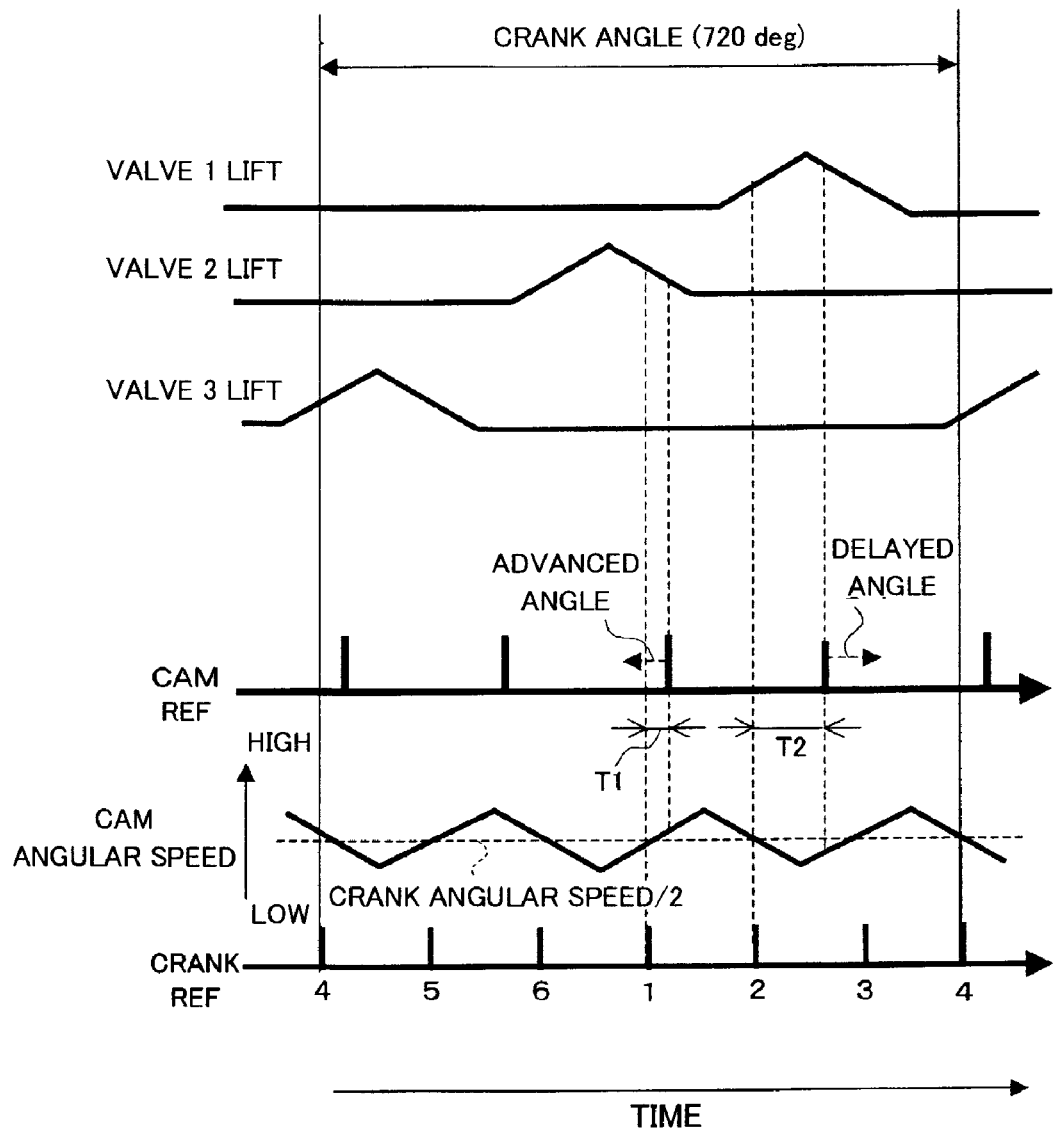
FIG. 16 is a view illustrating an example of cam shaft angular speed variation in the control apparatus of FIG. 14 for a cylinder injection internal combustion engine.
Figure 17:
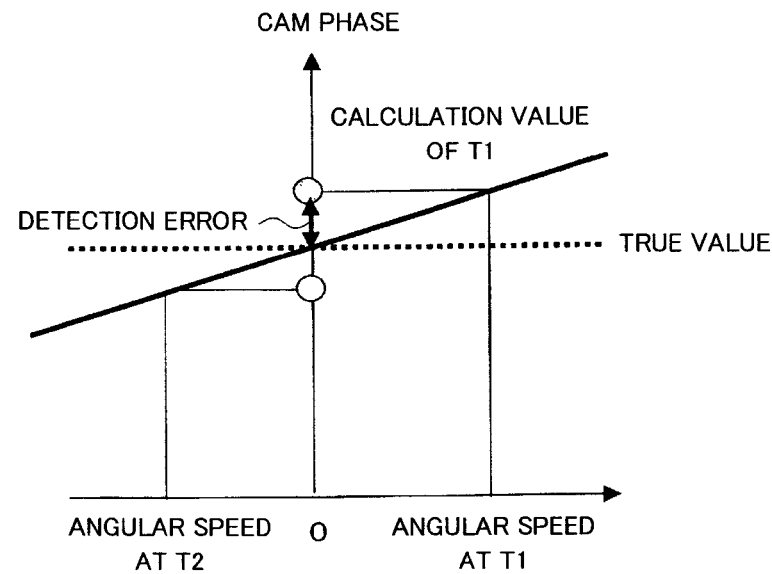
FIG. 17 is a view illustrating a relationship between cam shaft detection error and angular speed difference in the control apparatus of FIG. 16 for a cylinder injection internal combustion engine.
Figure 18:
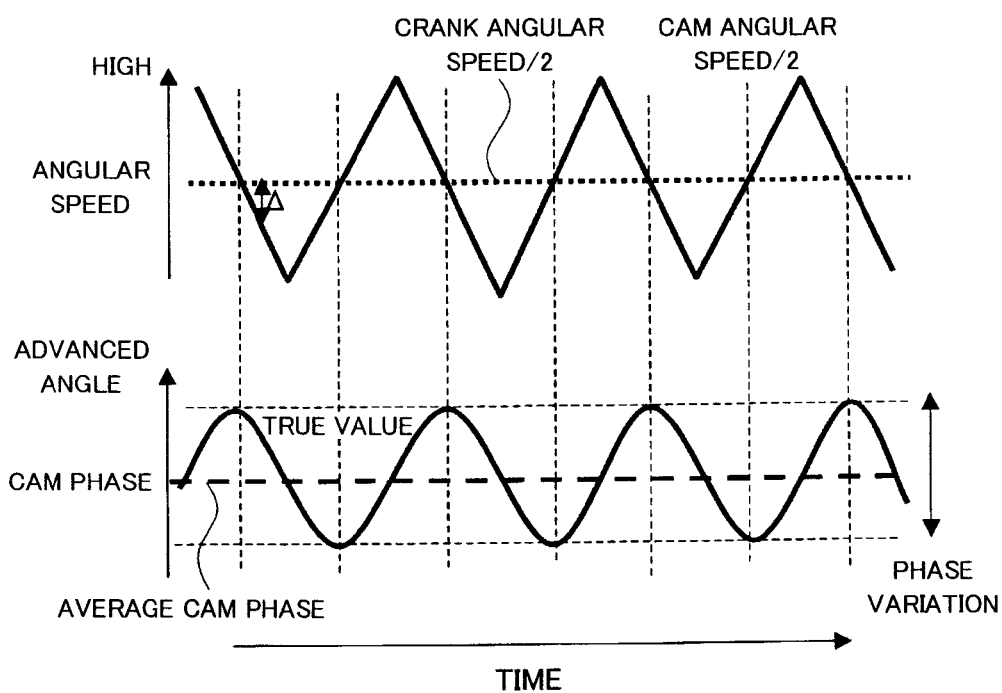
FIG. 18 is a view illustrating a relationship between cam shaft angular speed and phase variation in the control apparatus of FIG. 16 for a cylinder injection internal combustion engine.
Figure 19:
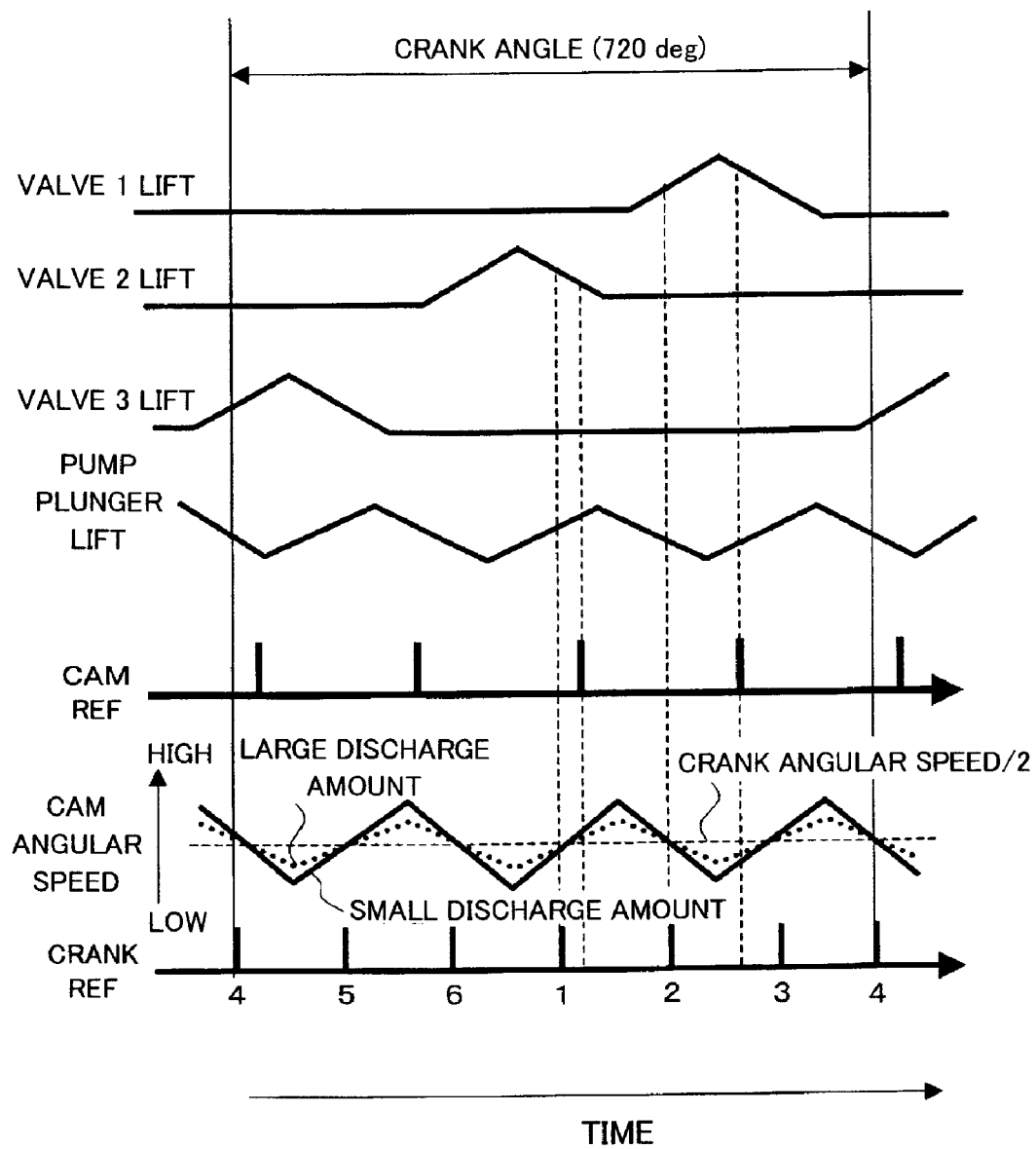
FIG. 19 is a view illustrating an example of cam shaft angular speed variation in the control apparatus of FIG. 16 for a cylinder injection internal combustion engine at the time of discharge amount variation.
Figure 20:
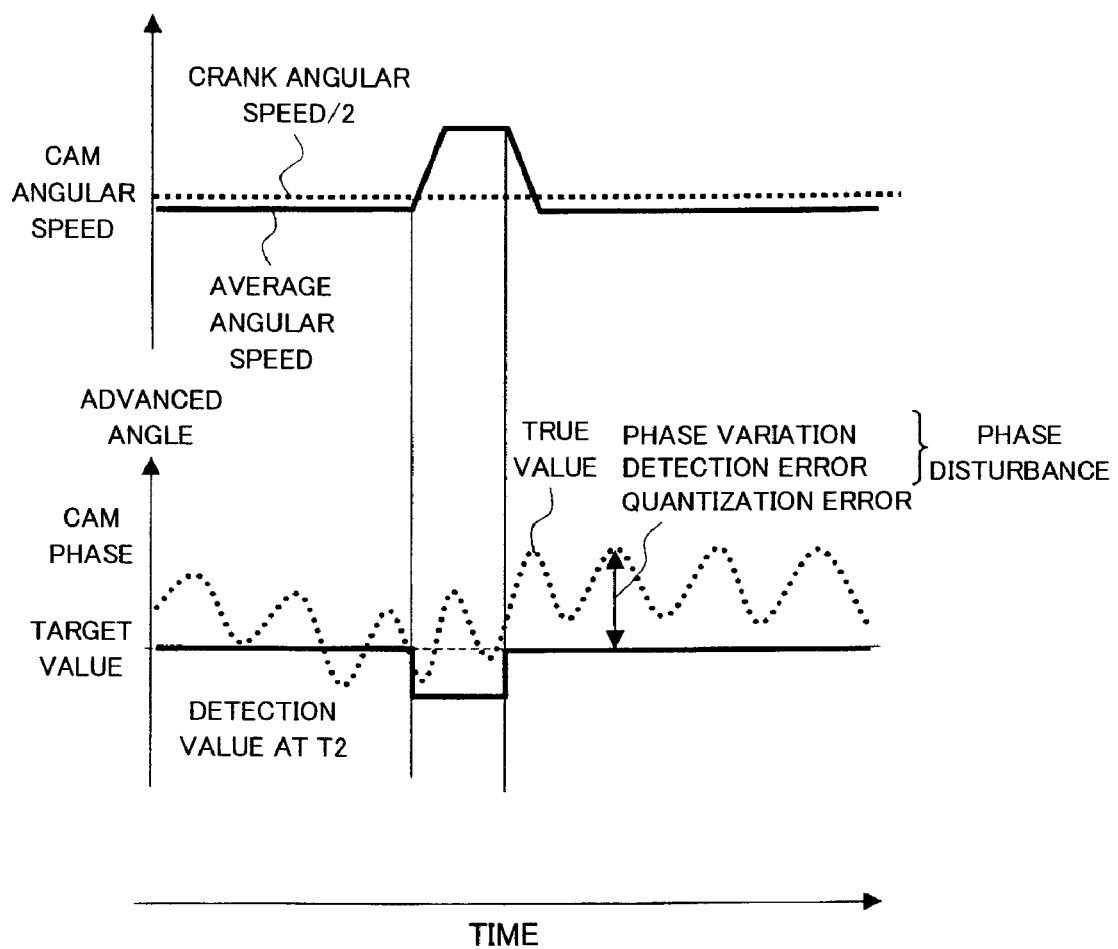
FIG. 20 is a view illustrating an example of cam shaft angular speed variation in the control apparatus of FIG. 16 for a cylinder injection internal combustion engine at the time of phase control.

FIG. 9 illustrates an example of time chart when the detailed block diagram of FIG. 15 is applied. With the related art control, even when the fuel pressure is uniform, when the cam phase detected by the cam angle sensor delays, OFF angle advances according to that phase. According to the present embodiment, since the phase is estimated from control DUTY, OFF angle is delayed by a given rate even in period a where the phase is uniform. In period b where DUTY has changed, OFF angle advances according to DUTY.

According to the present embodiment, since phase deviation is corrected by the cam phase control, discharge amount can be properly controlled.

Figure 10:
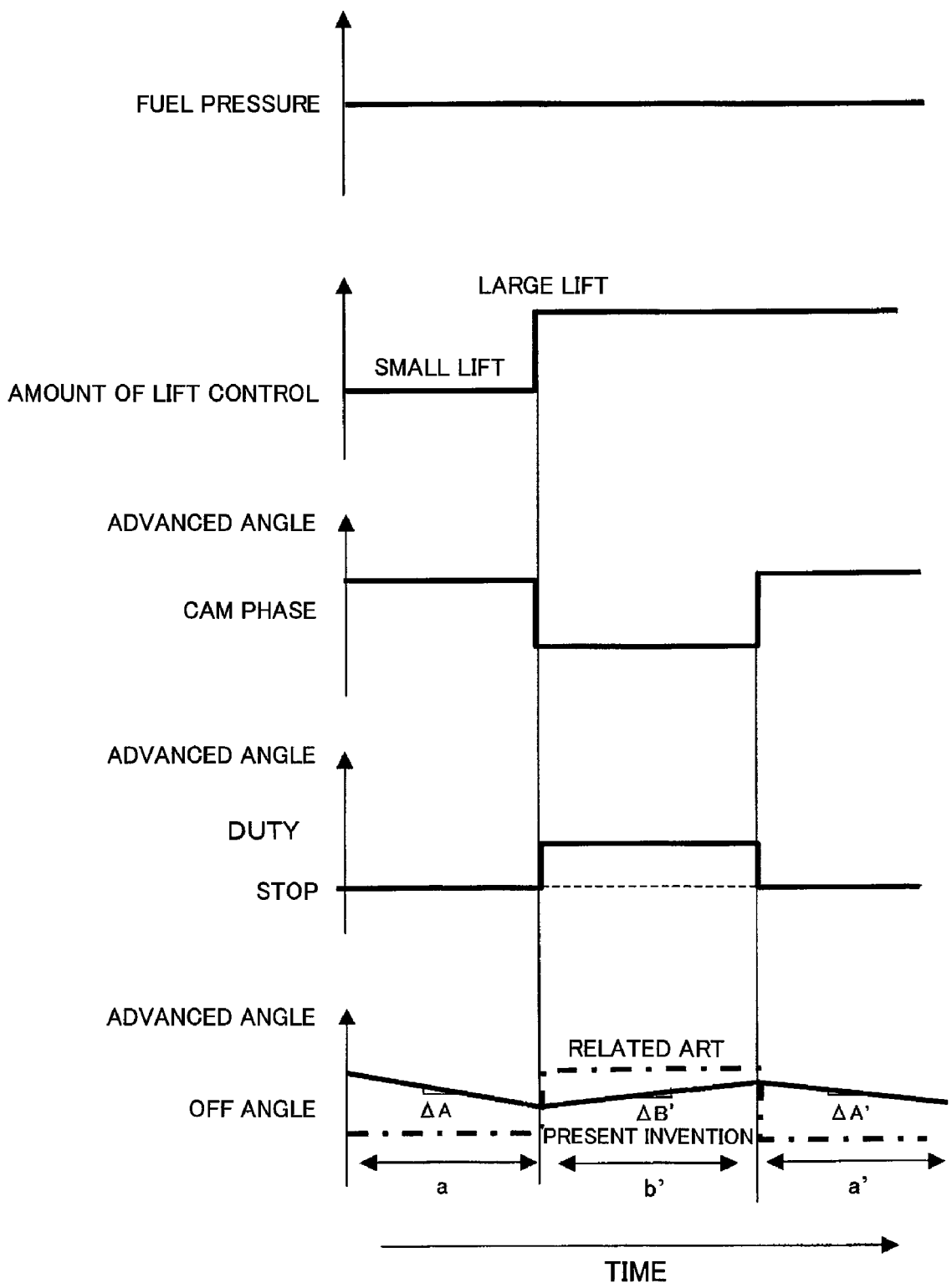
FIG. 10 is a time chart of another exemplary control by the control apparatus of FIG. 5 according to the first embodiment of the present invention.

FIG. 10 illustrates another example of time chart when the present embodiment is applied. Even when the fuel pressure is uniform, when the phase deviation when the lift amount is increased is detected in cam phase, according to the related art, OFF angle is delayed according to the cam phase. This cam phase variation occurs because the lift amount has increased, so that the phase deviation has increased; thus according to the related art, this cannot be quickly corrected. According to the present embodiment, the phase deviation associated with lift amount variation can be corrected. As a result, even when the cam phase is identical, there is a difference of OFF angle variation between period a and period a', and as the lift amount becomes large, the lift resistance delays larger and quicker; thus ΔA<ΔA'. ΔC' during advancing of phase also has a small value with respect to variation with the same DUTY. Consequently, the phase deviation caused by lift amount variation can be corrected, so that pulsation is prevented by proper fuel discharge.

Second Embodiment

There will be described a second embodiment of the control apparatus for a cylinder injection internal combustion engine with high-pressure fuel pump according to the present invention. That is, pump control which is robust with respect to phase deviation estimation error, will be described with reference to FIGS. 11 and 12.

Figure 11:
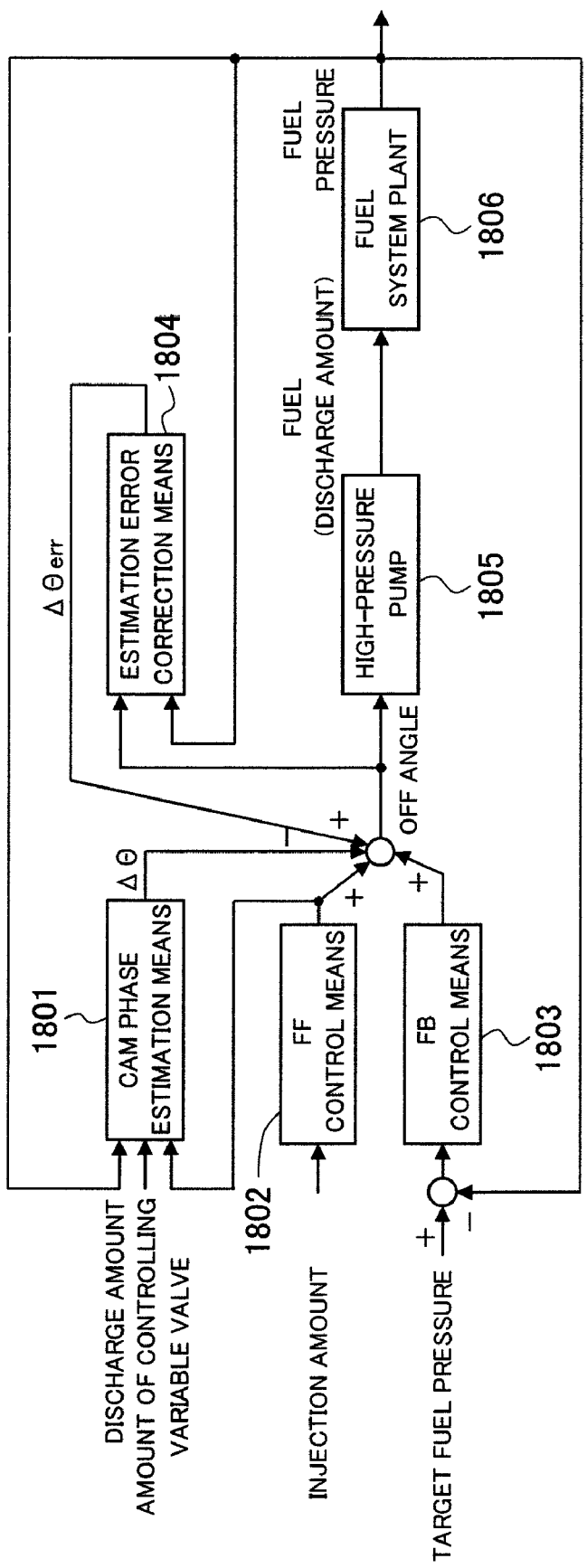
FIG. 11 is a block diagram illustrating the outline of pump control having phase deviation estimation error correction by a control apparatus for a cylinder injection internal combustion engine with high-pressure fuel pump according to a second embodiment of the present invention.

FIG. 11 is a block diagram illustrating the outline of the second embodiment. The difference from FIG. 5 lies in that a phase disturbance (estimation error) correction means 1804 is included. The estimation error correction means 1804 calculates phase deviation estimation error (Δθerr) from fuel pressure and OFF angle. The phase deviation estimation means 1801, FF control means 1802, FB control means 1803, high-pressure fuel pump 1805 and fuel system plant 1806 are identical to those of FIGS. 5 and 11, and hence an explanation thereof is omitted.

Figure 12:
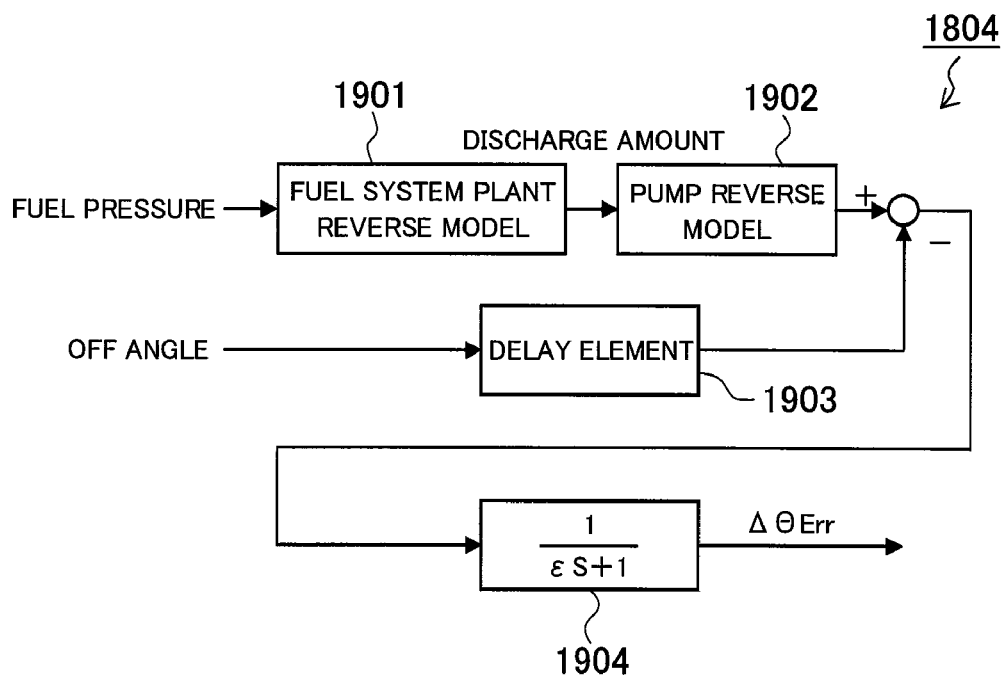
FIG. 12 is a detailed block diagram of estimation error correction by the control apparatus of FIG. 11.

FIG. 12 illustrates an example of the estimation error correction means 1804. First, the discharge amount of pump is calculated from the fuel pressure by use of a fuel system plant reverse model (inverse model) 1901. Subsequently, OFF angle is calculated from the discharge amount by use of a pump reverse model (inverse model) 1902. A delay element means 1903 delays the actually used OFF angle by a prescribed amount according to discharge timing. Specifically, the estimation error correction means 1804 (the reverse model 1901) calculates as ΔF the difference between the maximum value and the minimum value (the maximum value—the minimum value) of the value of the pressure fuel in a given period, and also calculates the discharge amount from the product of the volume of the fuel rail and a given coefficient K that is determined by the elastic constant of fuel (the volume of the fuel rail×a given coefficient K). Then, the estimation error correction means 1804 (the reverse model 1902) inputs the calculation results to the discharge amount to estimate the OFF angle.

Then, a difference between the OFF angle calculated by use of the pump reverse model 1902 and the delayed OFF angle calculated by use of the delay element means 1903 is passed through a given filter 1904 to calculate phase deviation estimation error. For example, here, a first-order delay filter is used; F is a design parameter. With this configuration, even when the phase deviation estimation means 1801 has estimation error, the difference between the fuel pressure estimation value obtained through the model and the actual fuel pressure measurement value can be compensated for, allowing implementation of pump control which is more robust with respect to phase deviation.

Third Embodiment

Finally, there will be described a third embodiment of the control apparatus for a cylinder injection internal combustion engine with high-pressure fuel pump. In the present embodiment, there will be described pump control when the high-pressure fuel pump is driven by a cam shaft having a variable lift mechanism.

Figure 13:
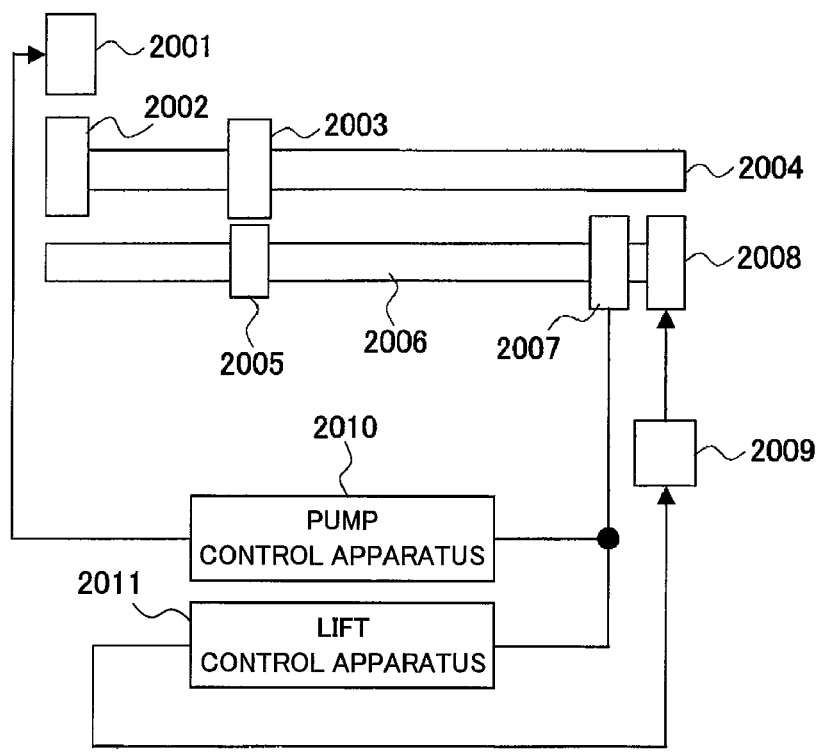
FIG. 13 is a view illustrating the outline of a configuration used in a variable lift mechanism of a control apparatus for a cylinder injection internal combustion engine with high-pressure fuel pump according to a third embodiment of the present invention.

FIG. 13 illustrates configurations of a pump control apparatus 2010 and lift control apparatus 2011 in an engine system having a variable lift mechanism according to the present embodiment. The lift amount of a lift mechanism 2003 of an inlet valve (or exhaust valve) installed in a cam shaft 2004 which drives a pump cam 2002 is controlled by a lift regulation mechanism 2005 installed in a lift control shaft 2006.

The lift control apparatus 2011 sends a control signal to a control shaft control mechanism 2008 to regulate the angle of the lift control shaft 2006 by use of a prescribed method (for example, oil pressure). The valve lift amount can be regulated according to the angle of the control shaft 2006.

The angle of the lift control shaft 2006 regulated by the control shaft control mechanism 2008 is detected by an angle sensor 2007 and using this value, the lift control apparatus 2011 regulates the lift amount to a target value. The pump control apparatus 2010 detects this lift amount by use of the angle sensor 2007 of the lift control shaft 2006, estimates phase deviation and corrects the pump OFF angle. With such configuration, phase deviation caused by lift resistance variation can be estimated accurately, so that higher-accuracy discharge amount control can be implemented.

What is claimed is:

1. A control apparatus for a cylinder injection internal combustion engine comprising a high-pressure fuel pump that raises the pressure of fuel and discharges the fuel to a fuel rail; and a fuel pressure sensor that detects a pressure of fuel stored in the fuel rail; wherein:

said control apparatus controls the high-pressure fuel pump based on the fuel pressure detected by the fuel pressure sensor;

said control apparatus further includes a cam phase estimation means for estimating a phase deviation, caused by variation of cam angular speed within a combustion cycle, of a cam shaft of the internal combustion engine which drives the high-pressure fuel pump; and based on a phase deviation estimation value calculated by the cam phase estimation means, said control apparatus corrects the amount of controlling the high-pressure fuel pump.

2. The control apparatus for a cylinder injection internal combustion engine according to claim 1, wherein the cam phase estimation means estimates the phase deviation of the cam shaft based on at least one of a fuel discharge amount from the high-pressure fuel pump and the state of an inlet or outlet variable valve of the internal combustion engine.

3. The control apparatus for a cylinder injection internal combustion engine according to claim 2, wherein the state of the variable valve corresponds to one of lift amount and advance angle quantity of cam phase.

4. The control apparatus for a cylinder injection internal combustion engine according to claim 2, wherein the difference between the phase deviation estimation value estimated based on the discharge amount of the high-pressure fuel pump and a detection value of a cam phase sensor of the cam shaft is made small as the fuel discharge amount of the high-pressure fuel pump increases.

5. The control apparatus for a cylinder injection internal combustion engine according to claim 2, wherein the phase deviation is estimated based on the lift amount of the variable valve, and the difference between the phase deviation estimation value and the detection value of the cam phase sensor is made large as the lift amount increases.

6. The control apparatus for a cylinder injection internal combustion engine according to claim 2, wherein the phase deviation is estimated based on the advance angle quantity of the phase of the variable valve, and the difference between the phase deviation estimation value and a detection value of the cam phase sensor is minimized when the advance angle quantity of the phase is a most retarded angle.

7. The control apparatus for a cylinder injection internal combustion engine according to claim 1, wherein the control apparatus further includes a phase disturbance correction means, and the phase disturbance correction means calculates phase disturbance based on a control command value to the high-pressure fuel pump and a detection value of the fuel pressure sensor and thereby corrects the amount of controlling the high-pressure fuel pump.

8. A control apparatus for a cylinder injection internal combustion engine comprising a high-pressure fuel pump that raises the pressure of fuel and discharges the fuel to a fuel rail, and a fuel pressure sensor that detects a pressure of fuel stored in the fuel rail; wherein:

the control apparatus controls the high-pressure fuel pump based on the fuel pressure detected by the fuel pressure sensor;

the internal combustion engine includes a variable lift mechanism that varies a cam lift amount of an inlet or outlet valve installed on a cam shaft that drives the high pressure fuel pump, and a lift sensor that detects the cam lift amount; and the control apparatus estimates, based on the cam lift amount detected by the lift sensor, phase deviation, caused by variation of cam angular speed within a combustion cycle, of the phase of the cam shaft of the internal combustion engine that drives the high pressure fuel pump, and corrects, based on the cam lift amount, an amount of controlling the high-pressure fuel pump.

* * * * *